United States Patent
Han et al.

(10) Patent No.: US 11,467,640 B2
(45) Date of Patent: Oct. 11, 2022

(54) POWER SUPPLY ENABLE CIRCUIT

(71) Applicant: SHENZHEN MENTAL FLOW TECHNOLOGY CO., LTD., Shenzhen (CN)

(72) Inventors: Bicheng Han, Shenzhen (CN); Chengbang Zhou, Shenzhen (CN); Baiwei Huang, Shenzhen (CN); Maoxing Liang, Shenzhen (CN)

(73) Assignee: SHENZHEN MENTAL FLOW TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/038,380

(22) Filed: Sep. 30, 2020

(65) Prior Publication Data
US 2021/0011535 A1    Jan. 14, 2021

Related U.S. Application Data

(63) Continuation of application No. PCT/CN2019/083447, filed on Apr. 19, 2019.

(30) Foreign Application Priority Data

Apr. 23, 2018  (CN) .......................... 201810365870.7

(51) Int. Cl.
*G06F 1/26* (2006.01)
*G06F 1/24* (2006.01)

(52) U.S. Cl.
CPC .............. *G06F 1/24* (2013.01); *G06F 1/266* (2013.01)

(58) Field of Classification Search
None
See application file for complete search history.

(56) References Cited

U.S. PATENT DOCUMENTS 4,176,400 A * 11/1979 Heckel ...................... G06F 5/06
                                                  713/502
5,258,952 A * 11/1993 Coker ...................... G11C 8/18
                                                  365/194

(Continued)

FOREIGN PATENT DOCUMENTS

CN    205283193 U    6/2016
CN    107688383 A    2/2018

(Continued)

OTHER PUBLICATIONS

International Search Report and Written Opinion in corresponding PCT Application No. PCT/CN2019/083447, dated Jul. 18, 2019.

*Primary Examiner* — Thomas J. Hiltunen
*Assistant Examiner* — Khareem E Almo
(74) *Attorney, Agent, or Firm* — Westbridge IP LLC

(57) ABSTRACT

Disclosed is a power supply enable circuit. The power supply enable circuit includes a multi-input NAND gate, input terminals of the multi-input NAND gate respectively connected to a plurality of activation signal sources; and a delay circuit, an input terminal of the delay circuit electrically connected to a shared activation signal source of the plurality of activation signal sources. An output terminal of the delay circuit is electrically connected to an enable input terminal of a power supply circuit after performing a logical AND with an output terminal of the multi-input NAND gate.

6 Claims, 1 Drawing Sheet

(56) References Cited

U.S. PATENT DOCUMENTS

| | | | | |
|---|---|---|---|---|
| 5,485,580 | A * | 1/1996 | Takai | H04L 12/40032 |
| | | | | 709/250 |
| 6,057,728 | A * | 5/2000 | Igarashi | H03K 17/0828 |
| | | | | 327/427 |
| 6,697,954 | B1 * | 2/2004 | Stufflebeam | G06F 1/24 |
| | | | | 712/228 |
| 6,906,574 | B2 * | 6/2005 | Ohi | H03K 17/168 |
| | | | | 327/392 |
| 7,425,048 | B2 * | 9/2008 | Sheahan | B41J 2/0458 |
| | | | | 347/17 |
| 7,685,216 | B2 * | 3/2010 | Kuyel | H03H 17/0461 |
| | | | | 708/300 |
| 7,948,277 | B2 * | 5/2011 | Nakatake | H03K 17/168 |
| | | | | 327/109 |
| 10,216,238 | B2 * | 2/2019 | Ego | H03K 17/22 |
| 11,095,283 | B2 * | 8/2021 | Inoue | H03K 17/0828 |

FOREIGN PATENT DOCUMENTS

| | | |
|---|---|---|
| CN | 108319353 A | 7/2018 |
| CN | 208061126 U | 11/2018 |

* cited by examiner

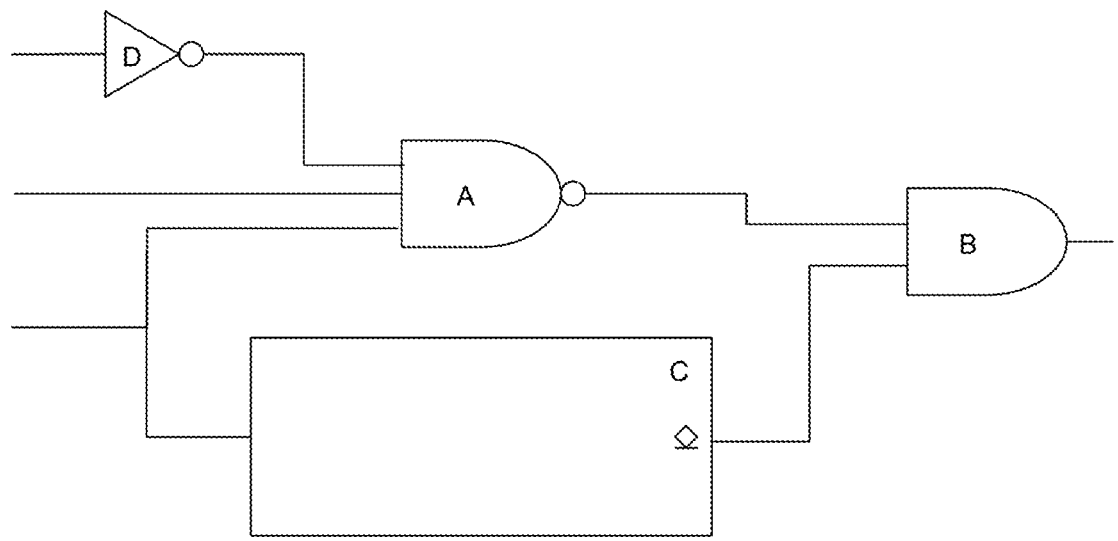

POWER SUPPLY ENABLE CIRCUIT

CROSS-REFERENCE TO RELATED APPLICATIONS

This application is a Continuation Application of PCT Application No. PCT/CN2019/083447, filed on Apr. 19, 2019, which claims priority to Chinese Application No. 201810365870.7, filed on Apr. 23, 2018, entitled "POWER SUPPLY ENABLE CIRCUIT", the entire disclosure of which is incorporated herein by reference.

TECHNICAL FIELD

The present disclosure relates to the technical field of power supply, in particular to a power supply enable circuit.

BACKGROUND

Currently, a power supply circuit as a device for supplementing electric energy of electronic device has been widely used in study and life production. When a main system of the electronic device is shut down, in order to minimize the power consumption, the power supply circuit is usually powered off. For example, an input signal of an enable terminal (a high level) of the power supply circuit is switched to a low level.

Since the electronic device needs to activate the main system when connected to an external power supply and entering a charging state, thereby displaying the charging light effect or communication demand, etc. Besides, the light effect cannot be display through using the battery or the power management module, and then the power supply circuit needs to be kept active when the external power supply is plugged in. However, the existing power supply circuit cannot activate the main system of the electronic device when connected to the external power supply.

The above content is only used to assist the understanding of the technical solution of the present disclosure, and does not mean that the above content is recognized as prior art.

SUMMARY

The main objective of the present disclosure is to provide a power supply enable circuit, which aims to solve the technical problem that the existing power supply circuit cannot activate the main system of the electronic device when connected to the external power supply.

In order to achieve the above objective, the present disclosure provides a power supply enable circuit, including:

a multi-input NAND gate, input terminals of the multi-input NAND gate respectively connected to a plurality of activation signal sources; and a delay circuit, an input terminal of the delay circuit electrically connected to a shared activation signal source of the plurality of activation signal sources;

an output terminal of the delay circuit is electrically connected to an enable input terminal of a power supply circuit after performing a logical AND with an output terminal of the multi-input NAND gate.

In an embodiment, the plurality of activation signal sources are valid for logic 0.

In an embodiment, the plurality of activation signal sources include an activation signal source outside a system; and the power supply enable circuit further includes a NOT gate, an input terminal of the NOT gate is electrically connected to the activation signal source outside the system, and an output terminal of the NOT gate is electrically connected to one of the input terminals of the multi-input NAND gate.

In an embodiment, the activation signal source outside the system is valid for logic 1.

In an embodiment, the power supply enable circuit further includes an AND gate, an input terminal of the AND gate is electrically connected to the output terminal of the delay circuit and the output terminal of the multi-input NAND gate, respectively, and an output terminal of the AND gate is electrically connected to the enable input terminal of the power supply circuit; or the output terminal of the delay circuit is electrically connected to the enable input terminal of the power supply circuit after performing a logical AND with the output terminal of the multi-input NAND gate.

In an embodiment, the multi-input NAND gate includes a three-input NAND gate.

In an embodiment, the plurality of activation signal sources include an output terminal of the NOT gate (D in FIG. 1), an output terminal of a switch circuit and an external power indication output terminal of a battery management chip; the three-input NAND gate is electrically connected to the output terminal of the switch circuit, the external power indication output terminal of the battery management chip, and the output terminal of the NOT gate, respectively.

In an embodiment, the power supply enable circuit further includes a first resistor, one terminal of the first resistor electrically connected to the output terminal of the NOT gate, another terminal of the first resistor electrically connected to an output terminal of the power supply circuit.

In an embodiment, the power supply enable circuit further includes a second resistor, one terminal of the second resistor electrically connected to an output terminal of the three-input NAND gate, another terminal of the second resistor electrically connected to the enable input terminal of the power supply circuit after performing a logical AND with the output terminal of the delay circuit.

In an embodiment, the switch circuit is provided with a tact switch; and when the tact switch is pressed, a signal output by the switch circuit to the three-input NAND gate is logic 0.

In technical solutions of the present disclosure, when any one of the plurality of activation signals is logic 0, the power supply circuit can be activated through the circuit, and then the main system of the corresponding electronic device can be activated. The main system is kept in the activated state, thereby avoiding the problem that the main system of the electronic device cannot be activated when the external power supply is plugged in, thereby improving the use efficiency of the power supply circuit, and the power supply circuit can be controlled to reset through the circuit. Generally, a signal simultaneously connected to the NAND gate and the delay reset circuit is a key signal, including but not limited to: a power supply lock signal output by the microcontroller, and an external power supply effective lock signal. The system can provide flexible single-button power start and reset functions, has a simple structure, and is easy to integrate, thereby improving the power efficiency of the system.

BRIEF DESCRIPTION OF THE DRAWINGS

FIG. 1 is a schematic structural diagram of a power supply enable circuit according to an embodiment of the present disclosure.

The realization of the objective, functional characteristics, and advantages of the present disclosure are further described with reference to the accompanying drawings.

DETAILED DESCRIPTION OF THE EMBODIMENTS

The technical solutions of the embodiments of the present disclosure will be described in more detail below with reference to the accompanying drawings. It is obvious that the embodiments to be described are only some rather than all of the embodiments of the present disclosure. All other embodiments obtained by persons skilled in the art based on the embodiments of the present disclosure without creative efforts shall fall within the scope of the present disclosure.

It should be noted that all the directional indications (such as up, down, left, right, front, rear . . . ) in the embodiments of the present disclosure are only used to explain the relative positional relationship, movement, etc. of the components in a certain posture (as shown in the drawings). If the specific posture changes, the directional indication will change accordingly.

Besides, the descriptions associated with, e.g., "first" and "second," in the present disclosure are merely for descriptive purposes, and cannot be understood as indicating or suggesting relative importance or impliedly indicating the number of the indicated technical feature. Therefore, the feature associated with "first" or "second" can expressly or impliedly include at least one such feature. In addition, the technical solutions between the various embodiments can be combined with each other, but they must be based on the realization of those ordinary skilled in the art. When the combination of technical solutions is contradictory or cannot be achieved, it should be considered that such a combination of technical solutions does not exist, nor does it fall within the scope of the present disclosure.

The present disclosure provides a power supply enable circuit.

As shown in FIG. 1, FIG. 1 is a schematic structural diagram of a power supply enable circuit according to an embodiment of the present disclosure.

In an embodiment of the present disclosure, the power supply enable circuit includes a multi-input NAND gate A and a delay circuit C.

The power supply enable circuit is applied to an electronic device provided with a power supply circuit. Input terminals of the multi-input NAND gate A are respectively connected to a plurality of activation signal sources.

An input terminal of the delay circuit C is electrically connected to a shared activation signal source of the plurality of activation signal sources. That is, the plurality of activation signal sources include a shared activation signal source, and the shared activation signal source is simultaneously electrically connected to the input terminal of the delay circuit C and one of the input terminals of the multi-input NAND gate. The plurality of activation signal sources are valid for logic 0.

An output terminal of the delay circuit C is electrically connected to an enable input terminal of a power supply circuit after performing a logical AND with an output terminal of the multi-input NAND gate A. In an embodiment, the power enable circuit further includes an AND gate B. An input terminal of the AND gate B is electrically connected to the output terminal of the delay circuit C and the output terminal of the multi-input NAND gate A, respectively. An output terminal of the AND gate B is electrically connected to the enable input terminal of the power supply circuit. Alternatively, the output terminal of the delay circuit C is electrically connected to the enable input terminal of the power supply circuit after performing a logical AND with the output terminal of the multi-input NAND gate A.

The above-mentioned delay circuit C is a programmable reset chip. In other embodiments, the power supply enable circuit further includes a power supply module electrically connected to the programmable reset chip. The power supply module is configured for supplying power to the programmable reset chip, so that the programmable reset chip is in a permanently powered-on state.

The programmable reset chip can be programmed to delay time. When an input signal of the shared activation signal source is logic 0 (low level '0'), if a duration of the logic 0 continuously exceeds a programming time (a preset duration), the programmable reset chip outputs logic 0 (low level '0') and keeps it for a period of time. For example, the programmable reset chip continuously outputs logic 0 (low level '0') for a preset period of time. In an embodiment, the programmable reset chip can continue to output logic 0 (low level '0') until the input signal of the shared activation signal source is switched to logic 1 (high level '1'). The programmable reset chip is an open collector output.

Further, in an embodiment, the plurality of activation signal sources include an activation signal source outside a system. The power supply enable circuit further includes a NOT gate D, an input terminal of the NOT gate D is electrically connected to the activation signal source outside the system, and an output terminal of the NOT gate D is electrically connected to one of the input terminals of the multi-input NAND gate A. That is, the output terminal of the NOT gate D serves as an activation signal source of the plurality of activation signal sources. The activation signal source outside the system is valid for logic 1.

Further, in an embodiment, the multi-input NAND gate A includes a three-input NAND gate.

The plurality of activation signal sources include an output terminal of the switch circuit and an external power indication output terminal of a battery management chip. An input terminal of the three-input NAND gate is electrically connected to the output terminal of the switch circuit, the external power indication output terminal of the battery management chip, and the output terminal of the NOT gate D, respectively.

A control output terminal of a microcontroller is an output pin of the microcontroller. When the microcontroller is in a power-on state, the output pin of the microcontroller outputs a high level. When the microcontroller is in a power-off state, the output pin of the microcontroller outputs a low level. After the microcontroller is powered off, it is not easy for the output pin of the microcontroller to maintain a high level. Some microcontrollers directly increase the use resistance of the output pin to a high level. When the pin of the power supply has no power input, the status of the pin is unstable, and sometimes there is even a large current leakage, that is, after the microcontroller is powered off, the output pin of the microcontroller generally outputs a low level. Therefore, in this embodiment, the NOT gate D is provided between the output pin of the microcontroller and the three-input NAND gate, and the enable input of the power supply circuit can be controlled through the output pin.

The power supply circuit is provided with an interface electrically connected to an external power supply. The battery management chip is a chip that can switch the effective input power to its output. For example: when there is only a battery in the power supply circuit, the battery management chip outputs the power of the battery; when there is an external power supply in the power supply circuit, the battery management chip outputs the power of the external power supply. The battery management chip can also charge the battery at the same time. The battery management chip is provided with an indication port that indicates that the external power supply is valid, that is, an external power indication output terminal. When the interface is connected to the external power supply, the external power indication output terminal of the battery management chip outputs logic 0 (low level '0').

The switch circuit is provided with a tact switch. When the tact switch is pressed, the signal output by the switch circuit to the three-input NAND gate is logic 0 (low level '0'). Generally, when the electronic device is in the shutdown state (a main system of the electronic device is closed), an additional method is needed to trigger the main system to work. The switch circuit can be a lockable switch, but a service life of the lockable switch is not as good as the tact switch. Therefore, in this embodiment, the switch circuit adopts the tact switch. Meanwhile, the use of the tact switch can provide additional input functions for the electronic device after the main system is successfully activated, so that the entire system only needs one tact switch to complete multiple functions, without an additional switch for the power supply.

In an embodiment, the power supply enable circuit further includes a first resistor, one terminal of the first resistor is electrically connected to the output terminal of the NOT gate D, and another terminal of the first resistor is electrically connected to an output terminal of the power supply circuit.

Further, the power supply enable circuit further includes a second resistor, one terminal of the second resistor is electrically connected to an output terminal of the three-input NAND gate, and another terminal of the second resistor is electrically connected to the enable input terminal of the power supply circuit after performing a logical AND with the output terminal of the delay circuit C.

In this embodiment, the second resistor protects the power supply enable circuit. When the electronic device is operating normally, a power-off (reset) function of the main system is realized through the switch circuit. Specifically, when the user presses the tact switch of the switch circuit for more than a period of time, the output terminal of the switch circuit outputs a logic 0 (low level '0') to the delay circuit C, and the delay circuit C forcibly outputs a logic 0 (low level '0'). At this time, due to the existence of the second resistor, whether the output terminal of the three-input NAND gate outputs a low level or a high level, the power supply enable circuit can work normally, thereby protecting the power supply enable circuit.

It should be noted that the microcontroller is electrically connected to the output terminal of the power supply circuit, and the power supply circuit supplies power for the microcontroller. When the microcontroller is in the power-on state, the control output terminal of the microcontroller outputs logic 0 (low level '0'). When the microcontroller is in the power-off state, the control output terminal of the microcontroller outputs logic 1 (high level '1').

In the power supply enable circuit of this embodiment, the plurality of activation signal sources include the output terminal of the switch circuit, the external power indication output terminal of the battery management chip and the control output terminal of the microcontroller. The output terminal of the switch circuit, the external power indication output terminal of the battery management chip and the control output terminal of the microcontroller can jointly adjust the input signal of the enable input terminal of the power supply circuit. The output terminal of the switch circuit, the external power indication output terminal of the battery management chip and the control output terminal of the microcontroller are all logic 1 (high level '1'), the input signal of the enable input terminal is logic 0 (low level '0'). In this way, the power supply circuit can be controlled to prohibit power supply to the electronic device, and the system can be powered off.

When the electronic device is operating normally, the switch of the switch circuit is not pressed, the output signal of the switch circuit is logic 1 (high level '1'), the battery management chip is connected to the external power supply, that is, the output signal of the external power indication output terminal of the battery management chip is high level '1', and only the control output terminal of the microcontroller outputs low level '0'. Therefore, after the main system of the electronic device is activated, if you want to close the main system, you can control the control output terminal of the microcontroller to output high level '1', that is, you only need to set the control output to high level '1', and the main system will be powered off and shut down. When the electronic device is operating normally, a power-off (reset) function of the main system can be realized through the switch circuit. Specifically, when the user presses the tact switch of the switch circuit for more than a period of time, the output terminal of the switch circuit outputs a logic 0 (low level '0') to the delay circuit C, and the delay circuit C forcibly outputs a logic 0 (low level '0'), thereby the enable input terminal of the power supply circuit can be set to a low level '0', the power supply circuit stops working. After the tact switch pops up, the switch circuit outputs a low level '1' to the delay circuit C, and the delay circuit C forcibly outputs a low level '1', such that the power supply circuit continues to supply power to its corresponding electronic device, and then the power-off (reset) function of the main system is achieved.

When the main system is powered off and shut down, the power supply circuit can be adjusted through the output terminal of the switch circuit, the external power indication output terminal of the battery management chip and the control output terminal of the microcontroller to make the power supply circuit supply power to its corresponding electronic device, thereby activating the main system.

In technical solutions of the present disclosure, when any one of the plurality of activation signals is logic 0, the power supply circuit can be activated through the circuit, and then the main system of the corresponding electronic device can be activated. The main system is kept in the activated state, thereby avoiding the problem that the main system of the electronic device cannot be activated when the external power supply is plugged in, thereby improving the use efficiency of the power supply circuit, and the power supply circuit can be controlled to reset through the circuit. Generally, a signal simultaneously connected to the NAND gate and the delay reset circuit is a key signal, including but not limited to: a power supply lock signal output by the microcontroller, and an external power supply effective lock signal. The system can provide flexible single-button power start and reset functions, has a simple structure, and is easy to integrate, thereby improving the power efficiency of the system.

The above are only some embodiments of the present disclosure, and do not limit the scope of the present disclosure thereto. Under the inventive concept of the present disclosure, equivalent structural transformations made according to the description and drawings of the present disclosure, or direct/indirect application in other related technical fields are included in the scope of the present disclosure.

What is claimed is:

1. A power supply enable circuit, comprising:
a multi-input NAND gate, input terminals of the multi-input NAND gate being respectively connected to a plurality of activation signal sources; and
a delay circuit, an input terminal of the delay circuit being electrically connected to a shared activation signal source of the plurality of activation signal sources;
wherein an output terminal of the delay circuit is electrically connected to an enable input terminal of a power supply circuit after performing a logical AND with an output terminal of the multi-input NAND gate;
the plurality of activation signal sources comprise an activation signal source outside a system;
the power supply enable circuit further comprises a NOT gate, an input terminal of the NOT gate is electrically connected to the activation signal source outside the system, and an output terminal of the NOT gate is electrically connected to one of the input terminals of the multi-input NAND gate;
the multi-input NAND gate comprises a three-input NAND gate;
the plurality of activation signal sources comprise an output terminal of the NOT gate, an output terminal of a switch circuit and an external power indication output terminal of a battery management chip;
the three-input NAND gate is electrically connected to the output terminal of the switch circuit, the external power indication output terminal of the battery management chip, and the output terminal of the NOT gate, respectively; and
the power supply enable circuit further comprises a first resistor, one terminal of the first resistor electrically connected to the output terminal of the NOT gate, another terminal of the first resistor electrically connected to an output terminal of the power supply circuit.

2. The power supply enable circuit of claim 1, wherein the plurality of activation signal sources are valid for logic 0.

3. The power supply enable circuit of claim 1, wherein the activation signal source outside the system is valid for logic 1.

4. The power supply enable circuit of claim 1, further comprising an AND gate, wherein:
an input terminal of the AND gate is electrically connected to the output terminal of the delay circuit and the output terminal of the multi-input NAND gate, respectively, and an output terminal of the AND gate is electrically connected to the enable input terminal of the power supply circuit; or
the output terminal of the delay circuit is electrically connected to the enable input terminal of the power supply circuit after performing a logical AND with the output terminal of the multi-input NAND gate.

5. The power supply enable circuit of claim 1, further comprising:
a second resistor, one terminal of the second resistor being electrically connected to an output terminal of the three-input NAND gate, another terminal of the second resistor being electrically connected to the enable input terminal of the power supply circuit after performing a logical AND with the output terminal of the delay circuit.

6. The power supply enable circuit of claim 1, wherein:
the switch circuit is provided with a tact switch; and
when the tact switch is pressed, a signal output by the switch circuit to the three-input NAND gate is logic 0.

* * * * *